United States Patent [19]
Sach et al.

[11] 3,922,259
[45] Nov. 25, 1975

[54] POLYMERS OF THE KUNITZ INHIBITORS, NEW MEDICAMENTS CONTAINING THESE POLYMERS AND METHOD FOR THEIR MANUFACTURE

[75] Inventors: Edgar Sach, Bures-sur-Yvette; Claude Raby, Chaville, both of France

[73] Assignee: Choay S.A., Paris, France

[22] Filed: Nov. 27, 1972

[21] Appl. No.: 309,834

[52] U.S. Cl. .............................................. 260/112.5
[51] Int. Cl.² ......................................... C07C 103/52
[58] Field of Search .................................. 260/112.5

Primary Examiner—Elbert L. Roberts
Attorney, Agent, or Firm—Gerard J. Weiser, Esq.; Alfred Stapler, Esq.; Karl L. Spivak, Esq.

[57] ABSTRACT

Polymers or condensation products of the Kunitz inhibitor contain several Kunitz inhibitor molecules linked together, if necessary, by coupling groups such as those derived from glutaraldehyde. The products, especially the soluble polymers, having a molecular weight from about 12,000 to about 150,000, are valuable in the treatment of shock.

24 Claims, 1 Drawing Figure

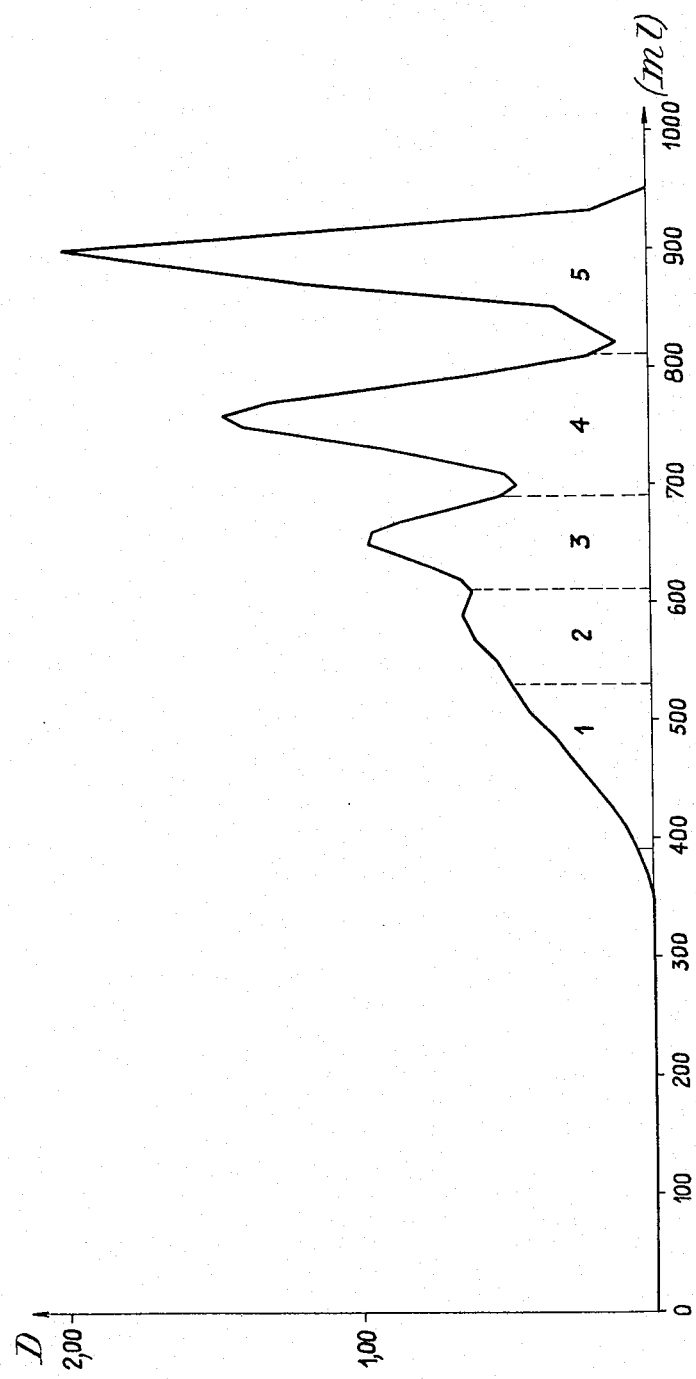

POLYMERS OF THE KUNITZ INHIBITORS, NEW MEDICAMENTS CONTAINING THESE POLYMERS AND METHOD FOR THEIR MANUFACTURE

The invention relates to products resulting from transformation of the well-known polypeptide constituted by the Kunitz inhibitor.

It is known that the Kunitz inhibitor is antagonistic to the activity of a certain number of enzymes such as plasmin, trypsin, chymotrypsin, the kallikreins, the tripeptidases of the phlyctene liquid, etc.

It comes into play in certain other enzymatic systems without its mode of action being still very clearly elucidated.

On account of the multiplicity of its actions, there are cases where its use in therapeutics risks becoming delicate and necessitates a certain number of biological determinations which only well-equipped laboratories are capable of carrying out. For example, it can become indispensable to be reassured, by tests rather unfamiliar in current practice, that the inhibitor can be injected without its antifibrinolytic activity being dangerous. This is especially the case in the pathology of shock.

In fact, in the course of a state of shock, there is always observed an activation of the coagulation system and a fibrinolytic reaction indispensable for the maintenance of blood fluidity. There occurs on the other hand, and perhaps arising from hypercoagulation, a liberation of bradykinins by activation of the kallikreinogenic- kallikrein system.

The Kunitz inhibitor acts within this syndrome at several levels, and its very high antiplasmin activity especially is not desirable if the fibrinolytic activity must persist in order to dissolve fibrinous formations which would risk obstructing the capillary vessels and also of causing ischemias.

It is an object of the invention to provide a medicament better adapted to certain syndromes bringing into play among other things, disturbances of the coagulationlysis system, and especially for the treatment of shock.

The product according to the invention is constituted by a polymer or condensation product containing several Kunitz inhibitor molecules connected together, if necessary by means of coupling groups, such as those derived from glutaraldehyde.

The new products thus obtained which, for convenience of language will, in the following, be designated by the expression "Kunitz inhibitor polymers" or "Kunitz polyinhibitors", are revealed to be of a very particular advantage in therapeutics, especially as regards soluble polymers.

It is noted in fact, that in a general manner, these polymers, especially the soluble polymers, have with respect to the Kunitz inhibitor a reinforced hypocoagulant activity and a reduced antiplasmin activity whilst the anti-kallikrein activity remains substantially equivalent.

These various activities are hence modified in the Kunitz polyinhibitor in the sense which results in rendering its use favorable in certain treatments, especially in those of shock pathology. In such syndromes, among others, the reinforcement of its anti-coagulant activity provides therein a medicament of all the greater value as it remains adapted to ensure at the same time control of the Kallikreinogenic-kallikrein system and, to a certain extent also, the plasminogenic system.

The invention relates also to a method for the manufacture of the Kunitz polyinhibitor, which method is characterised in that the Kunitz inhibitor is made to react with a protein coupling agent comprising functional groups adapted to react with those borne by the Kunitz inhibitor in saline solution.

Excellent results are obtained by using glutaraldehyde as the coupling agent.

According to a preferred embodiment of the method according to the invention, the polymerisation reaction is carried out in the midst of a solution buffered to a pH comprised between 3 and 7, preferably between 3 and 4, the concentration of glutaraldehyde of the medium being comprised between 0.1 and 5%, preferably between 0.1 and 1%.

It was noted that the concentration of the Kunitz inhibitor in the medium did not greatly effect the final degree of polymerisation. For essentially practical reasons, concentrations of the Kunitz inhibitor between 1 and 10% would be used.

Preferably, the process is carried out in solutions buffered with sodium acetate or with sodium borate. When the pH and the concentration of glutaraldehyde occur within the above-mentioned preferred ranges, the molar concentration of the buffering agent does not appear to influence considerably the course of the reaction. When operation is effected at a pH higher than 4, it is however advantageous to work with relatively low molar concentrations of the buffering agent, for example not exceeding 0.1 M when the buffering agent is constituted by sodium acetate.

Under the same conditions, the time factor would also assume importance, the reaction then having to be interrupted before the first manifestations of gelling of the medium appear. The time of reaction can thus vary, for example, from 5 minutes to 24 hours.

To isolate the soluble polymers from the reaction mixture, recourse would advantageously be had to fractionation by column chromatography, for example filtration of the mixture on a gel of the molecular sieve type, then in the supplementary step, lyphilisation of the fractions collected.

These Kunitz inhibitor polymers are also soluble in physiological serum 9 p. 1,000 and glucose 50 p. 1,000.

Purely by way of indication, and without this being regarded as limiting, it may be indicated that the molecular weight of the soluble polymers of the Kunitz inhibitor should be situated between about 12–13,000 and a value itself situated between 80 and 150,000.

Naturally there can also be manufactured soluble polymers of the Kunitz inhibitor, the latter being easily obtained especially by operating at pHs and concentrations of glutaraldehyde higher than mentioned in the foregoing, for example at pHs above 7 and at concentrations of glutaraldehyde higher than 5%.

The invention consists, apart from the abovementioned features, of certain other features which are preferably used at the same time and which will be more explicitly considered below. The invention will in any case be more fully understood by means of the additional description and examples which follow, as well as of the accompanying drawings, given of course purely by way of non-limiting example.

In the drawings, FIG. 1 is a graph of the chromatographic fractionation of a polymerisation medium of a Kunitz inhibitor.

Below, there are given two numerical examples illustrating the method of polymerisation according to the invention of the Kunitz inhibitor.

EXAMPLE 1

There are placed in solution 300 mg of highly purified Kunitz inhibitor in 30 ml of a buffer solution of 0.2 M sodium acetate of pH 4.0.

There is then added 0.6 ml of a solution of 25% glutaraldehyde.

After stirring at room temperature for 4 1/2 hours, the reaction mixture is fractionated by carrying out filtration on a gel. For this purpose, a gel known commercially under the name "Sephadex G-75", is used in a column of 4 × 100 cm equilibrated by an 0.2 M ammonium acetate solution of pH 7.0.

Fractions of 10 ml are collected whose optical density is measured at 280 nm and of which the trypsin inhibiting activity is determined by back titration with trypsin solutions of known strength, for example by the method described in the French Pharmacopea, 8th edition, page 1240.

The graph of fractionation of this solution is shown in FIG. 1, the latter indicating as a function of the volume (in ml) of eluant passing through the column: a. The variation in optical density D measured at 280 nm (or transmission in the eluant; b. The fractions numbered from 1 to 5 in which antitrypsin activity is present.

It is observed that the fractions 1 to 3 possess trypsin inhibiting activity. Their position on the chromatogram (volume of elution) enables it to be observed that it relates to fractions of the Kunitz inhibitor of more or less pronounced polymerisation. The polymers of fraction 2 (molecular weight of about 20,000) appear to be constituted principally by trimers of the Kunitz inhibitor, those of fraction 3 (molecular weight of about 12–13,000) by dimers. It should be noted that probably in both cases average populations of the polymers are concerned. Below are given the titres of each of these fractions (expressed in protease inhibiting units per mg of dry products: $\mu$/mg).

Fraction 1: 15,000 $\mu$/mg
Fraction 2: 25,000 $\mu$/mg
Fraction 3: 40,000 $\mu$/mg
Fraction 4 is constituted by the Kunitz inhibitor which has not reacted and has a content or titre close to the initial titre (50,000 $\mu$/mg) or even higher than the latter.
Fraction 5, which has a strong yellow coloration, is constituted by glutaraldehyde.

The polymers obtained in fractions 2 and 3 can be obtained by direct lyphilisation of the abovesaid fractions, without prior dialysis.

EXAMPLE 2

There are placed in solution 3 g of highly purified Kunitz inhibitor, in 30 ml of a buffer solution of 0.1 M sodium acetate of pH 4.0.

There is added 0.6 ml of a 25% solution of glutaraldehyde.

After agitation for an hour, at ambient temperature, the reaction mixture is subjected to filtration on a gel. There is used for this purpose Sephadex G-75 gel in a column of 3 × 150 cm equilibrated by an 0.2 M ammonium acetate solution of pH 7.0.

Fractions of about 10 ml are collected. There are given below the titres of the three first fractions and the weight of product recovered:

Fraction 1: 34 mg of product titrating at about 21,000 $\mu$/mg

Fraction 2: 714 mg of product titrating at about 26,000 $\mu$/mg
Fraction 3: 1.227 g of product titrating at about 40,000 $\mu$/mg The polymers contained in these fractions can be obtained by a direct lyphilisation of the latter, without prior dialysis.

As regards the fourth fraction, it is constituted by monomeric Kunitz inhibitor and includes 0.889 g of said monomer titrating at about 60,000 $\mu$/mg.

The fifth fraction is constituted by glutaraldehyde.

EXAMPLE 3

There are given the results of several series of experiments which have enabled the preferred operational conditions of the method according to the invention for obtaining a soluble Kunitz polyinhibitor to be obtained.

There is first indicated for each series the proportions of reactants used and the other conditions observed in each experiment of a same series, then there is mentioned the parameter which is caused to vary and, in the elements of the Tables, the state of the reaction medium or of the "solution" obtained at the end of each of the experiments.

The abbreviations "solut.", "doubt" and "precip." are used instead and in place of the words "solution", "doubtful" and "precipitate" respectively.

Series a

Conditions - Kunitz inhibitor 10%
Glutaraldehyde 0.5%
0.1 M Sodium acetate or
0.1 M Sodium borate buffer
Time 15 min - 25°C
Variation of the pH of the buffer

| pH | 3 | 4 | 5 | 6 | 7 | 8 | 9 |
|---|---|---|---|---|---|---|---|
| Solut. | clear | clear | doubt | doubt | doubt | precip. | precip. |

Series b

Conditions - Kunitz inhibitor 10%
Glutaraldehyde 0.5%
0.1 M Sodium acetate or
0.1 M Sodium borate buffer
Time 60 min - 25°C
Variation of the pH of the buffer

| pH | 3 | 4 | 5 | 6 | 7 |
|---|---|---|---|---|---|
| Solut. | clear | clear | doubt | doubt | precip. |

Series c

Conditions - Kunitz inhibitor 10%
Glutaraldehyde 0.5%
0.1 M Sodium acetate or
0.1 M Sodium borate buffer
Time 3 h - 25°C
Variation of the pH of the buffer

| pH | 3 | 4 | 5 | 6 | 7 |
|---|---|---|---|---|---|
| Solut. | clear | clear | doubt | precip. | precip. |

Series d

Conditions - Kunitz inhibitor 10%
Glutaraldehyde 0.5%
pH 4
Time 15 min - 25°C
Molar variation of the Sodium acetate buffer

| molarity | 0.025 M | 0.05 M | 0.1 M | 0.2 M | 0.5 M |
|---|---|---|---|---|---|
| Solut. | clear | clear | clear | clear | clear |

Series e

Conditions - Kunitz inhibitor 10%
Glutaraldehyde 0.5%
pH 6
Time 15 min - 25°C
Molar variation of the Sodium acetate buffer

| molarity | 0.025 M | 0.05 M | 0.1 M | 0.2 M | 0.5 M |
|---|---|---|---|---|---|
| Solut. | clear | clear | clear | precip. | precip. |

Series f

Conditions - pH 4
Glutaraldehyde 0.5%
0.1 M Sodium acetate buffer
Time 15 min - 25°C -continued

| | Variation of concentation of the Kunitz inhibitor | | |
|---|---|---|---|
| Kunitz Solut. | 1% clear | 5% clear | 10% clear |

Series g

Conditions - pH 4
Kunitz inhibitor
0.1 M Sodium acetate buffer
Time 15 min - 25°C

| | Variation of the concentration of Glutaraldehyde | | | | | |
|---|---|---|---|---|---|---|
| Glutarald. Solut. | 0.1% clear | 0.5% clear | 1% clear | 1.5% clear jelled in 60 min | 2% clear jelled in 45 min | 2.5% clear jelled in 30 min |
| Glutarald. Solut. | 3% clear jelled in 25 min | 4% clear jelled in 20 min | 5% jelled | 10% jelled | | |

The pharmacological experiments described below have established the properties of the Kunitz polyinhibitors.

A. Hypocoagulating properties

For clarity in the description which follows, there will be recalled in diagrammatic manner the principal steps of the coagulation process, which is normally initiated in the presence of a hydrophilic agent or under the effect of wettability caused at the level of the hydrophobic vascular walls, for example by a lesion or an abnormal tissular change.

The process of coagulation comprises essentially three successive steps:

1. Thromboplastin formation or formation of prothrombinase, induced by the interaction of blood plasma and cellular factors and in the presence of $Ca^{++}$ ions, this chain of enzymatic reactions being initiated by activation in contact with hydrophobic surfaces of so-called "contact" factors;

2. Thrombin formation or transformation of prothrombin into thrombin under the action of prothrombinases;

3. Fibrin formation, and in other words hydrolysis, induced by thrombin, of the soluble fibrinogen of the blood into insoluble fibrin.

The action of Kunitz polyinhibitors on the coagulation of the blood has been studied in vitro by the method so-called of thromboelastography on plasma preparations rich in platelets collected in tubes with hydrofuged walls, especially in silicone glass, and supplemented with trisodium citrate in order to form chelates of the calcium ions present in the plasmin. Under these conditions, the contact factors contained in the preparations are activated to the minimum and the preparations do not coagulate (absence of ionised calcium), the initiation of the coagulation process being then obtainable by recalcification, on adding calcium chloride.

The plasma test preparations contain 0.5 ml of plasma rich in platelets to which was added 0.101 ml of a physiological saline solution containing from 50 to 4,000 units of protease inhibitors per ml ($\mu$/ml) of the Kunitz polyinhibitor whose anticoagulant activity it was desired to measure.

The principle of the method consists in comparing the coagulation time of the plasma of these preparations with that of control preparations of the same composition, but free of anticoagulating agent, according to the technique described in "Biologie des Hemorragies et des Thromboses", C. Raby - Masson Ed. Paris 1966 (pages 186 – 188).

It will be recalled here that for clarity in the description that this technique applies the increase in viscosity of a blood preparation in the course of coagulation. The principle of this technique consists in subjecting the vessel contained in the preparation under study to an angular oscillating movement, and in studying the effects of coagulation on a cylinder suspended at the end of a torsion wire and dipping into the preparation. When coagulation starts, the plasma contained in the vessel entrains the cylinder in its oscillatory movements.

There is taken for instant $t = 0$ of coagulation the moment when activation of the factors responsible for coagulation is caused, by the addition of $Ca^{++}$ ions under the above-indicated conditions.

The abbreviations used in the following are as follows:

r the latent time which precedes the effective initiation of coagulation;

a m the maximum amplitude of the oscillations of the cylinder;

k the interval of time comprised between the moment when the cylinder starts to oscillate and the moment when the amplitude of the movement becomes equal to the maximum amplitude obtained under the same conditions with a plasma free of platelets.

The "total coagulation time" of a preparation is constituted by the sum $r + k$ (which varies generally from 25 to 35 millimeters in a normal subject).

According to the abovesaid technique, the extreme angular positions reached by the cylinder as a function of time, are established optically and photographically, the graphs or tracings obtained generally having the shapes of tuning forks.

The experiments were carried out by means of the polymer isolated from fraction 2 of Example 2, which had a molecular weight of about 65,000 (fraction A) and by means of the dimer of the Kunitz inhibitor (fraction B) constituted by a fraction 3, with reference to FIG. 1, isolated in an identical experiment.

The activity of the Kunitz polyinhibitors A and B was studied successively:
on the total coagulation of plasmas of the type concerned,
in comparison with those of glutaraldehyde and of conventional Kunitz inhibitor,
at the level of each of the coagulation phases.

1. Study of the effect of A on plasma coagulability in vitro:

a. Study of their effect on various preparations derived from a same specimen

Various tests were first carried out to study the coagulability of plasmas rich in platelets, derived from a same specimen, as a function of the concentration of A.

In the preparations used, the concentrations of polymer varied from 100 $\mu$/ml to 4,000 $\mu$/ml, which corresponds to therapeutic doses of 250,000 $\mu$ to 10,000,000 $\mu$ for an adult.

In the Table below, there are assembled the values $r + k$, which values are proportional to the coagulation time and the values of the maximum amplitudes $a\ m$ obtained for each of these preparations and for the control preparations.

TABLE I

|  | $r + k_{mm}$ | $am_{mm}$ |
|---|---|---|
| 1) Control preparation | 27 | 44 |
| Preparation with 100 µ/ml of A | 31 | 45 |
| Preparation with 200 µ/ml of A | 35 | 45 |
| Preparation with 500 µ/ml of A | 41 | 43 |
| 2) Control preparation | 30 | 46 |
| Preparation with 1,000 µ/ml of A | 45 | 49 |
| Preparation with 2,000 µ/ml of A | 72 | 47 |
| 3) Control preparation | 26 | 51 |
| Preparation with 3,000 µ/ml of A | 52 | 52 |
| 4) Control preparation | 32 | 50 |
| Preparation with 4,000 µ/ml of A | 117 | 47 |

It emerges from examination of this Table that the polymerised Kunitz inhibitor exerts a very distinct hypocoagulating effect on plasma coagulation.

On the other hand, the results obtained show that the hypocoagulant effect exerted by the polymer according to the invention, varies as a function of the concentration of polymer. It can be seen that this effect is already considerable for concentrations of 500 µ/ml of polymer and gives particularly satisfactory results when the concentration of the polymer is 2,000 µ/ml. Now this concentration corresponds to a therapeutic dose of 5,000,000 µ, which represent, in the case of the monomer, the minimal dose used in therapeutics.

b. Variations in coagulability as a function of the nature of the plasma

Preparations were provided constituted by five plasmas rich in platelets a, b, c, d, e derived from various specimens. The coagulability of these preparations whose concentrations of A were, either 2,000 µ/ml, or 3,000 µ/ml, was measured.

The results obtained are displayed in Table II below.

TABLE II

|  | $r + k_{mm}$ | $am_{mm}$ |
|---|---|---|
| Control a | 29 | 45 |
| preparation a with 2,000 µ/ml | 70 | 52 |
| Control b | 29 | 45 |
| preparation b with 2,000 µ/ml | 62 | 44 |
| Control c | 30 | 54 |
| preparation c with 2,000 µ/ml | 100 | 52 |
| Control d | 28 | 50 |
| preparation d with 2,000 µ/ml | 69 | 52 |
| Control e | 30 | 53 |
| preparation e with 2,000 µ/ml | 51 | 49 |
| Control a | 24 | 55 |
| preparation a with 3,000 µ/ml | 86 | 46 |
| Control b | 27 | 60 |
| preparation b with 3,000 µ/ml | 102 | 59 |
| Control c | 27 | 53 |
| preparation c with 3,000 µ/ml | 54 | 55 |

The results obtained show that the anticoagulant effect exerted by A depends on the nature of the plasma. These results varied according to the spontaneous coagulability of the plasma used, this coagulability being due especially to the content of fibrinogen, of platelets and of the factor 13 of the plasma.

However, the results obtained established in all cases the anticoagulant properties of the polymer according to the invention.

2. Study of the effect of B on plasma coagulability by carrying out the same tests as previously (on various plasmas)

The results obtained are collected in Table III.

TABLE III

|  | $r + k_{mm}$ | $am_{mm}$ |
|---|---|---|
| 1) Control preparation | 35 | 60 |
| preparation with 1,000 µ/ml | 60 | 60 |
| Control preparation | 40 | 55 |
| prepration with 1,000 µ/ml | 90 | — |
| 2) Control preparation | 33 | 56 |
| preparation with 2,000 µ/ml | 100 | 52 |
| Control preparation | 36 | 58 |
| preparation with 2,000 µ/ml | 91 | 55 |
| Control preparation | 37 | 59 |
| preparation with 2,000 µ/ml | 77 | 56 |
| 3) Control preparation | 44 | 45 |
| preparation with 3,000 µ/ml | 79 | 44 |
| 4) Control preparation | 40 | 44 |
| preparation with 4,000 µ/ml | 72 | 47 |

It is observed that with the plasmas, used in these tests, the values obtained for $r + k$ in the case of the control preparations slightly exceeded the upper limit normally obtained for a normal subject. However, it emerges from the examination of these results that B exerts in all cases a very distinct hypocoagulant effect on the plasmas used. As in the tests carried out with A, the hypocoagulant effect of B varies as a function of the nature of the plasma and of the concentration of polymer.

3. Comparison of the activity of Kunitz polyinhibitors A and B and of those of the principles from which they are derived a. Action of glutaraldehyde on plasma coagulability in vitro:

The measurements of the coagulation time were carried out on control preparations constituted by 0.5 ml of plasma rich in platelets and 0.1 ml of isotonic chloride solution and on preparations constituted by 0.5 ml of plasmas rich in platelets and 0.1 ml of an 0.5% glutaraldehyde solution.

The results obtained are collected in Table IV below.

TABLE IV

|  | $r + k_{mm}$ | $am_{mm}$ |
|---|---|---|
| Control | 50 | 54 |
| preparation with 0.1 ml glut. | 48 | 53 |
| Control | 34 | 55 |
| preparation with 0.1 ml glut. | 30 | 55 |
| Control | 55 | 53 |
| preparation with 0.1 ml glut. | 51 | 53 |

Examination of these results shows that glutaraldehyde is practically without anticoagulant effect on the plasma preparations used. It tends rather to accelerate coagulation.

b. Comparative tests effected by means of the Kunitz inhibitor and polymers according to the invention on plasma coagulation:

The control preparations were constituted by 0.5 ml of plasmas rich in platelets and 0.1 ml of isotonic chloride solution.

There were firstly compared the coagulation times of preparations treated with Kunitz inhibitor marketed under the trademark "Iniprol" and preparations treated with A. The concentrations of "Iniprol" and of A in the preparations studied, expressed in antiprotease units, were identical and increased from 100 µ/ml to 3,000 µ/ml.

The results obtained are collected in Table V below.

TABLE V

| | r + k$_{mm}$ | am$_{mm}$ |
|---|---|---|
| Control | 27 | 44 |
| preparation with 100 μ/ml of Iniprol | 27 | 48 |
| preparation with 100 μ/ml of A | 31 | 45 |
| preparation with 200 μ/ml of Iniprol | 31 | 43 |
| preparation with 200 μ/ml of A | 35 | 45 |
| preparation with 500 μ/ml of Iniprol | 34 | 45 |
| preparation with 500 μ/ml of A | 41 | 43 |
| Control | 29 | 56 |
| preparation with 1,000 μ/ml of Iniprol | 38 | 52 |
| preparation with 1,000 μ/ml of A | 48 | 56 |
| Control | 29 | 45 |
| preparation with 2,000 μ/ml of Iniprol | 41 | 45 |
| preparation with 2,000 μ/ml of A | 70 | 52 |
| Control | 29 | 45 |
| preparation with 2,000 μ/ml of Iniprol | 50 | 47 |
| preparation with 2,000 μ/ml of A | 62 | 44 |
| Control | 30 | 54 |
| Preparation with 2,000 μ/ml of Iniprol | 36 | 56 |
| preparation with 2,000 μ/ml of A | 100 | 52 |
| Control | 28 | 50 |
| preparation with 2,000 μ/ml of Iniprol | 44 | 52 |
| preparation with 2,000 μ/ml of A | 69 | 52 |
| Control | 30 | 53 |
| preparation with 2,000 μ/ml of Iniprol | 36 | 49 |
| preparation with 2,000 μ/ml of A | 51 | 49 |
| Control | 27 | 60 |
| preparation with 3,000 μ/ml of Iniprol | 48 | 55 |
| preparation with 3,000 μ/ml of A | 102 | 59 |
| Control | 24 | 55 |
| preparation with 3,000 μ/ml of Iniprol | 24 | 55 |
| preparation with 3,000 μ/ml of A | 86 | 46 |
| Control | 27 | 53 |
| preparation with 3,000 μ/ml of Iniprol | 34 | 54 |
| preparation with 3,000 μ/ml of A | 54 | 55 |

Examination of this Table enables it to be concluded that the polymer according to the invention exerts an anticoagulant effect greater than that of Iniprol. This difference emerges particularly for concentrations equal to or greater than 1,000 μ/ml of inhibitor.

In Table VI below, there are indicated the results obtained by carrying out the same comparative tests as previously, but by using B. The concentrations of monomer and of dimer were equal at 2,000 μ/ml.

TABLE VI

| | r + k$_{mm}$ | am$_{mm}$ |
|---|---|---|
| 1) Control | 28 | 44 |
| preparation with 2,000 μ/ml of Iniprol | 37 | 49 |
| preparation with 2,000 μ/ml of B | 48 | 50 |
| 2) Control | 36 | 58 |
| preparation with 2,000 μ/ml of Iniprol | 42 | 57 |
| preparation with 2,000 μ/ml of B | 91 | 55 |
| 3) Control | 37 | 59 |
| preparation with 2,000 μ/ml of Iniprol | 42 | 58 |
| preparation with 2,000 μ/ml of B | 77 | 56 |

This Table establishes that even the smallest polymers of the Kunitz inhibitor exert an extremely distinct anticoagulant effect.

4. Activity of Kunitz polyinhibitors at the level of each of the coagulation phases a. Action on fibrin formation:

The action A and of B on the fibrin formation step was studied by measuring the diluted thrombin time. To this end, the above-indicated citrated or oxalated preparations were mixed at 37°C, each being formed from 1 ml of plasma supplemented by 2,000 units of Kunitz polyinhibitor in 0.1 ml of solution with a suitable amount of diluted thrombin. After recalcification of the preparations, the time which elapsed until coagulation was measured.

The results obtained are given below:

| | Diluted thrombin time |
|---|---|
| Control | 24 sec. |
| preparation with 2,000 μ of A | 25 sec. |
| preparation with 2,000 μ of B | 25 sec. |

These results showed that the polymers according to the invention have no influence on thrombin time.

b. Effect on thrombin and fibrin formation:

A possible effect of A and of B on the two steps of the coagulation process was sought, by measuring the Quick time of the above-indicated preparations.

The citrated or oxalated preparations were mixed at 37°C with a solution of calcium thromboplastin and the time (Quick time) which elapses until the formation of the first fibrin filament was measured.

The results obtained are given below:

| | Quick time |
|---|---|
| Control | 17 sec. |
| preparation with 2,000 μ of A | 17.5 sec. |
| preparation with 2,000 μ of B | 17 sec. |

It is noted from these results that the polymers according to the invention do not act on the stages of thrombin and fibrinformation.

c. Effect on thromboplastin formation:

Non-activated plasma preparations were provided and the coagulation of these preparations when the activity of the factors responsible for coagulation or contact factors are initiated in the presence or the absence of polymers according to the invention, was studied by thromboelastography.

The measurements were effected by means of the following preparations:

The coagulation times r + k measured on these various preparations are given in Table VII below:

TABLE VII

| | r + k$_{mm}$ |
|---|---|
| Control a (non-activated) | 24 |
| Control b (activated) | 18 |
| preparation c | 54 |
| preparation d | 57 |
| preparation e | 38 |
| preparation f | 45 | a = a control preparation taken in a silicone glass tube and constituted by 1 ml of native plasma rich in platelets;

b = a control preparation identical with the first and taken in a tube of ordinary glass, which bears Ca$^{++}$ ions, activating the "contact" factors of the plasma;

c and d = plasma preparations taken in tubes of silicone glass supplemented respectively by 100 γ of A and 100 γ of B;

e and f = plasma preparations taken in tubes of ordinary glass and supplemented respectively by 100 γ of A and 100 γ of B;

of control preparation a constituted by 1 ml of plasma which is collected in a silicone glass tube, so that it is not activated, a control preparation *b* of identical composition to that of control *a*, collected in a tube of ordinary glass, producing activation of the contact factors, preparations *c, d, e, f* collected in tubes of hydrofuged glass (*c* and *d*) and non-hydrofuged glass (*e* and *f*) and supplemented by 100 γ/ml of A as regards preparations *c* and *e* and of B as regards *d* and *f*.

Examinations of these results shows that the polymers according to the invention slow down the activation of the factors responsible ffor coagulation and weaken their effect when the latter are already activated. This applies hence, just as much to prior as to subsequent intervention of calcium ions in the step of thromboplastinformation.

B. Inhibiting properties of the Kunitz polyinhibitor with respect to pancreatic kallikrein and of plasmin Tests for establishing these properties have been carried out with a fraction of Kunitz polyinhibitor titrating 44,000 μ/mg and of average molecular weight 14,000. This fraction is constituted by a majority of dimers and, for this reason, is similar to fraction B mentioned previously.

The same tests were repeated with the nonpolymerised Kunitz inhibitor, under identical experimental conditions.

Recourse is had, in the effects of the type concerned, to the following methods of estimation:

a. Estimation of the trypsin

The estimation was carried out on a synthetic substrate constituted by the ethyl ester of benzoyl-L-arginine, by means of a titrimetric method with a pH-stat. Twenty micromoles of the ester abovementioned are dissolved in 0.1 ml of water; 0.9 ml of an 0.0015 M borate buffer was added containing calcium chloride $CaCl_2$ at a concentration of 0.02 M and brought to pH 0.8 by hydrochloric acid.

The medium was kept at 25°C under a current of nitrogen. 10 μg of trypsin dissolved in 0.001 N hydrochloric acid was added. The acidity liberated was titrated, at pH 8.0, by means of 0.01 N soda.

The inhibiting effect of the inhibitor is manifested by a reduction in the amount (measured at 37°C after 3 minutes of incubation) of the hydrolysed substrate with respect to that obtained in the presence of the same amount of trypsin, in the absence of the inhibitor.

b. Titration of kallikrein

The estimation was carried out under the same conditions as above, in the presence of 5 μg of kallikrein dissolved in a buffer, for example 0.05 M tris (hydroxymethyl)-amino-methane (called "tris" below) containing sodium chloride at a concentration of 0.25 M and brought to pH 8.0 with acetic acid.

As previously, the inhibition is represented by the difference in activity between the kallikrein alone and between that of the kallikrein incubated in the presence of the inhibitor (for 3 minutes at 37°C).

c. Titration of plasmin

A standard solution of plasmin which contained 10 uCTA per ml was diluted 10 times with an 0.06 M tris-0.09 M NaCl buffer at pH 7.5.

Volumes of 0.4 and 0.8 ml respectively of this diluted solution were made up to 2.5 ml with the tris-NaCl buffer indicated above. To these dilute solutions were added 2.5 ml of a casein solution which contained 1.4 grams in 100 ml of tris-NaCl buffer. It was shaken and allowed to incubate at 37°C.

After intervals of time of 2 minutes and of 32 minutes, aliquot portions of 2 ml were taken out from the contents of each tube and transferred into 3 ml of 0.5 M perchloric acid. The precipitates formed were shaken and centrifuged for 15 minutes at +4°C.

The absorption at 275 nm of the supernatent liquids was then measured by using samples taken off two minutes after incubation as controls.

By definition, 1 uCTA of plasmin liberates 0.1 microequivalents of tyrosin per minute. The inhibition of plasmin is manifested by a reduction in the activity of the plasmin in the presence of the inhibitor with respect to that of plasmin incubated alone (for 3 minutes at 37°C).

The results of these tests are reported in the Table below, the inhibitor activities of the polymer with respect to trypsin, pancreatic kallikrein and plasmin being expressed as percentages of those of the monomeric Kunitz inhibitor.

TABLE VIII

|  | Trypsin | Pancreatic Kallikrein | Plasmin |
| --- | --- | --- | --- |
| Polymer | 81.5% | 75% | 52.1% |
| Kunitz Inhibitor | 100% | 100% | 100% |

This Table establishes the fact that the polymer has antitrypsin, antikallikrein and antiplasmin effects which are reduced with respect to those of the Kunitz inhibitor. It should however be noted that the antiplasmin activity diminishes more quickly with polymerisation than the two others, which drop substantially in the same proportion, within the limits of titrating errors.

C. Analgesic activity of the Kunitz polyinhibitor

It was noted that the Kunitz polyinhibitor also had a considerable analgesic effect, as was established in the "acetic acid contraction test".

There are administered to the mouse, by the intraperitoneal route, 6% acetic acid in a 10% gum solution. This substance causes convulsions and the number of convulsions caused is counted.

The Kunitz polyinhibitor is administered by the intraperitoneal route 60 minutes before the injection of acetic acid. The results show as a percentage, the reduction in the number of convulsions in 15 treated mice with respect to three control mice which do not receive the Kunitz polyinhibitor.

The following results are indicative of the results that the Kunitz polyinhibitor can provide:

| Number of units injected | % reduction |
| --- | --- |
| 50,000 μIP/kg | − 22% |
| 25,000 μIP/kg | − 15% |

The analgesic activity observed with this experimental model is of the anti-bradydinin type.

D. Study of the tolerance of the Kunitz polyinhibitor a. $LD_{50}$ by the intravenous route in the mouse Studies of the acute toxicity were carried out with a batch of Kunitz polyinhibitor whose molecular weight was around 14,000, hence with a polymer similar to that of the fraction 3 of Example 1. This polymer administered to the mouse by the intravenous route shows itself to have an $LD_{50}$ higher than 8,000,000 units per kg of body weight.

b. Tolerance to intravenous administration in the dog

The study was carried out on six Beagle dogs, aged from about eight months and weighing from 15 to 18 kg. There was administered to them, under pentothal anesthesia, doses of Kunitz polyinhibitor of 200,000 to 900,000 units/kg, according to the dog, in one or several injections.

These injections did not cause significant chemical changes in the alveolar carbonic acid gas pressure, the respiratory frequency and volume, the cardiac frequency nor in the rectal temperature. The first injection in certain dogs resulted in a drop in arterial pressure, which drop could however be averted by prior treatment with phenergan and with atropine.

Study of the biological and nematological perameters has confirmed the hypocoagulant effect on the Kunitz polyinhibitor, without significant effects of the number of thrombocytes even in those of the dogs which manifested a certain drop in arterial pressure under the above-indicated conditions.

c. Investigation of possible central effects in the rabbit

This study was carried out in six male rabbits, of average weight 2.5 kg.

The animals were kept in restraining cages situated in a quiet place and the cortical reactivity was explored by means of sound stimulation and slightly nociceptive stimulation (stimulation of the dorsal cutaneous nerve endings by means of a Kocher pincer).

The intravenous injection of 300,000 $\mu$/kg of the Kunitz polyinhibitor did not result in changes which could be considered as significant in the electrocorticograms and the electrocardiograms effected on these rabbits.

These experiments show that the polymer of the Kunitz inhibitor retains the excellent tolerance of the monomer.

The invention hence contributes, with the soluble Kunitz polyinhibitors, a substantial advance especially in the field of therapy of states of shock, in the course of which there are developed, according to a variable chronology, vaso-motor disorders and hypercoagulation with which are connected phenomena of anoxia, ischemia and processes of irreversibility of these states. The polymers, whilst preserving all the properties of the monomeric Kunitz inhibitor, are however much less delicate in use, due to the fact of the reduction of their antiplasmin effects, the maintenance of substantially the whole of their antikallikrein activity and the reinforcement of their hypocoagulant activity.

This progress is all the more evident if one takes into account that shocks of the traumatic or surgical type require immediate action, leaving scarcely any time for doctors to proceed with all the titrations and checks, without which the use of the monomeric Kunitz inhibitor can be quite delicate.

The administration of the medicaments according to the invention, is facilitated by the fact of their high solubility in aqueous media. It can therefore be done by direct intravenous injection or by perfusion of a solution of the Kunitz polyinhibitor in a sterile and apyrogenic liquid vehicle suited to this mode of administration, especially in the midst of a saline or glucosed isotonic solution. By way of indication, the total human daily posologic dose can be comprised between about 4 million and about 30 million units of the active principle.

The medicaments according to the invention can be aministered by the injectable route.

As is self-evident and as emerges already from the foregoing, the invention is in no way limited to the embodiments which have been more especially indicated; it encompasses, on the contrary, all modifications.

We claim:

1. A Kunitz inhibitor polymer which has at least the molecular weight of a dimer.

2. The soluble Kunitz inhibitor polymer of claim 1.

3. The polymer of claim 4 wherein the molecular weight of the polymer is from about 12,000 to about 150,000.

4. The polymer of claim 3 having a molecular weight from about 12,000 to 14,000.

5. The polymer of claim 3 having a molecular weight about 20,000.

6. The polymer of claim 4 having a molecular weight about 65,000.

7. Method for the preparation of a Kunitz inhibitor polymer, which comprises polymerizing by reacting a Kunitz inhibitor in a saline solution at ambient temperature, and separating the Kunitz inhibitor polymer.

8. Method according to claim 7, wherein the polymerization is carried out in the presence of glutaraldehyde.

9. Method according to claim 8, wherein the polymerization is conducted in a buffer solution whose pH lies in the range from about 3 to about 7.

10. Method according to claim 9, wherein the reaction is carried out in a buffer solution whose pH lies in the range from about 3 to about 4 and the concentration of glutaraldehyde of the medium being between 0.1 and 5%.

11. Method according to claim 10, wherein the concentration of glutaraldhyde of the medium is between 0.1 and 1%.

12. Method according to claim 9, wherein the initial concentration of the Kunitz inhibitor in the medium is between about 1 and about 10%.

13. A soluble Kunitz inhibitor polymer having protein-coupled groups.

14. The Kunitz inhibitor polymer of claim 13 wherein the protein-coupled groups are glutaraldehyde-coupled.

15. The Kunitz inhibitor polymer of claim 2 which is soluble in physiological serum.

16. The Kunitz inhibitor polymer of claim 2 which is soluble in a solution of glucose.

17. A Kunitz inhibitor polymer which is a trimer.

18. A Kunitz inhibitor polymer which is a dimer.

19. An aquous solution of the polymer of claim 2.

20. The solution of the polymer of claim 19 which is buffered.

21. The solution of claim 20 which has a pH in the range of 3 to 4.

22. The process of claim 7 wherein the polymerization is carried out in a buffered solution.

23. The process of claim 7 wherein the polymerization is carried out at a pH above 7.

24. The process of claim 7 wherein a Kunitz inhibitor monomer is mixed with glutaraldehyde, the polymerization carried out, the polymer formed and separating the Kunitz inhibitor polymer.

* * * * *